United States Patent [19]

Mazziotti

[11] Patent Number: 4,541,819
[45] Date of Patent: Sep. 17, 1985

[54] UNIVERSAL JOINT EMPLOYING BEARING ROLLERS

[75] Inventor: Philip J. Mazziotti, Toledo, Ohio

[73] Assignee: The Zeller Corporation, Defiance, Ohio

[21] Appl. No.: 517,757

[22] Filed: Jul. 27, 1983

[51] Int. Cl.$^4$ ............................................. F16D 3/24
[52] U.S. Cl. ................................... 464/144; 464/146; 464/906
[58] Field of Search ................ 308/188, 215; 464/143, 464/144, 145, 146, 906

[56] References Cited

U.S. PATENT DOCUMENTS 2,911,805  11/1959  Wildhaber ...................... 464/906 X
3,447,341  6/1969  Miller, Jr. ........................ 464/145 X
4,023,382  5/1977  Welschof ............................ 464/146

FOREIGN PATENT DOCUMENTS 45-00608  1/1970  Japan .................................... 464/145
1500768  2/1978  United Kingdom ................ 464/146

Primary Examiner—Stuart S. Levy
Assistant Examiner—Daniel P. Stodola
Attorney, Agent, or Firm—Allen D. Gutchess, Jr.

[57] ABSTRACT

A constant velocity universal joint is provided which employs bearing rollers with central cylindrical portions and groove-matching ends in place of balls. The universal joint has an inner race or member with outwardly-facing grooves spaced therearound, an outer race or member with inwardly-facing grooves therearound, and a cage between with openings. The rollers are retained in the openings with the cylindrical portions located at the openings and with the ends engaged in the grooves of the inner and outer races. The central cylindrical portions engage the cage at the openings in line contact rather than point contact, as with balls, resulting in less wear, longer life, and smooth operation. The ends engage the grooves in a manner somewhat similar to balls.

15 Claims, 6 Drawing Figures

UNIVERSAL JOINT EMPLOYING BEARING ROLLERS

This invention relates to a constant velocity universal joint employing bearing rollers having central cylindrical portions and groove-matching ends in place of balls.

In a constant velocity universal joint, the torque is transmitted by balls, which are arranged between inner and outer races and in contact with grooves therein. The balls are retained in openings in a cage located around the inner race and point contact is made between the balls and the edges of the openings. The central cylindrical portions of the rollers in accordance with the invention provide line contact between the rollers and the cage rather than point contact as is true when balls are employed in the universal joint. This reduces the concentration of forces and reduces wear, as well as provides a longer life for the universal joints.

The rollers also enable constant velocity universal joints to be repaired more easily. In such an instance, the grooves in the inner and outer races are ground oversize to again achieve smooth, uniform surfaces thereon. Rollers with larger ends to fit the larger grooves are then employed. The central cylindrical portions of the rollers can be of the same diameter as the original balls whereby the same cage or a cage with the same size openings as the original one can be employed.

It is, therefore, a principal object of the invention to provide a constant velocity universal joint employing bearing rollers in place of balls, which universal joint has the advantages discussed above.

Many other objects and advantages of the invention will be apparent from the following detailed description of preferred embodiments thereof, reference being made to the accompanying drawings, in which.

Figure 1:
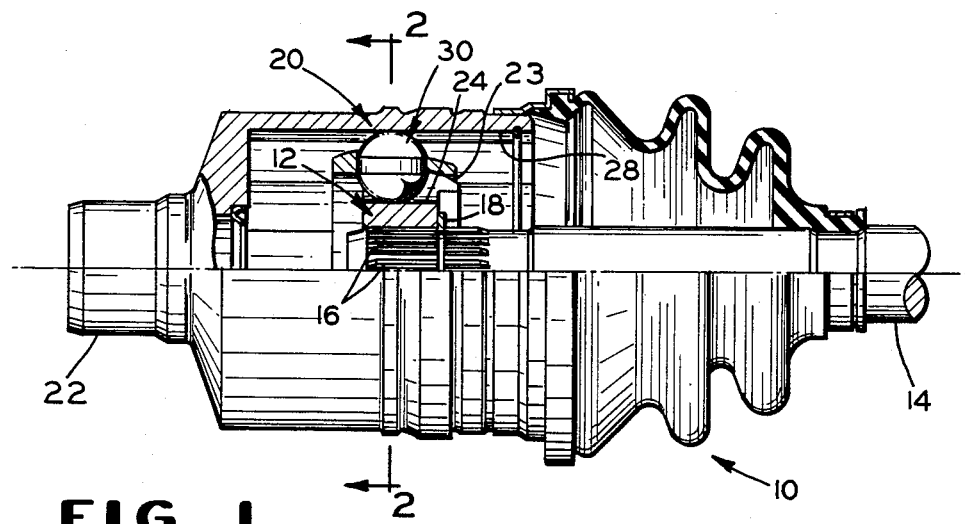
FIG. 1 is a longitudinal view, partly in elevation and partly in section, of a plunge-type constant velocity universal joint embodying the invention.
Figure 2:
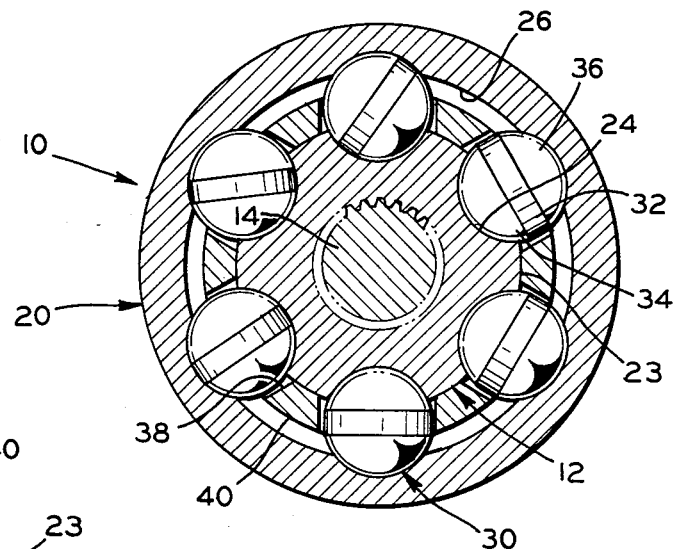
FIG. 2 is an enlarged view in transverse cross section taken along the line 2—2 of FIG. 1.
Figure 3:
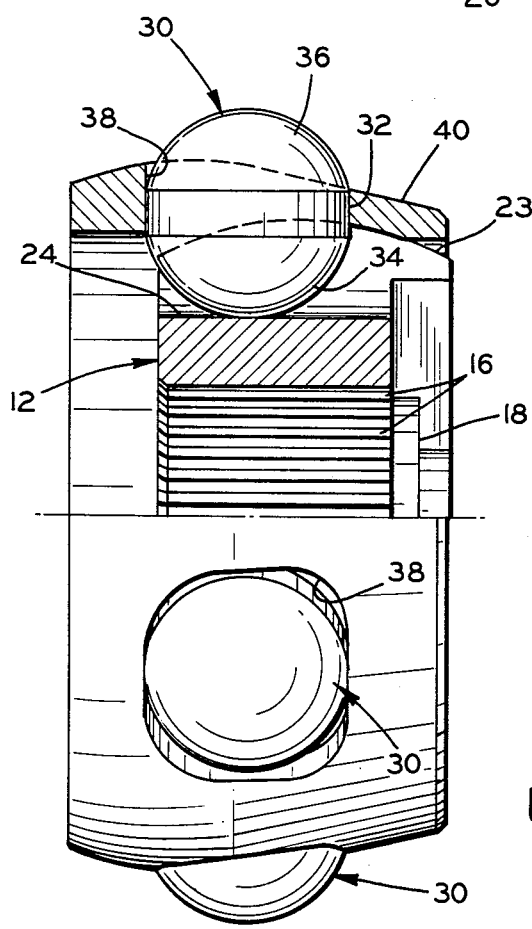
FIG. 3 is an enlarged view, partly in elevation and partly in section, of certain components of the universal joint of FIG. 1.

Referring to FIGS. 1-3, a plunge-type constant velocity universal joint embodying the invention is indicated at 10. Such joints are also shown in U.S. Pat. No. 3,442,095 issued May 6, 1969 and U.S. Pat. No. 3,464,232 issued Sept. 2, 1969. The universal joint includes an inner, hub member or race 12 mounted on a shaft 14 by splines 16 and a snap ring 18, or other suitable means. The joint also includes an outer member or race 20 which, in this instance, is integral with a stub shaft 22. The hub member 12 has a partially spherical outer surface 23 and a plurality of straight grooves 24 extending longitudinally of the axes of the shaft 14 and the member 12.

The outer member 20 has a partially cylindrical cavity 26 in which are circumferentially spaced grooves 28 extending longitudinally of the axes of the stub shaft and the member 20. The grooves 24 and 28 are equally spaced around the members and form roller tracks receiving rollers 30 which move therealong during articulation and plunge. The grooves 24 and 28 are arcuate in transverse cross section, in this instance, with equal radii. The rollers 30 have central cylindrical portions 32 with round ends 34 and 36, in this instance, which are received in the grooves 24 and 28, respectively. The round ends 34 and 36 also have equal radii, in this instance, which fit or match the grooves 24 and 28. Further, the radii of the round ends 34 and 36 have a common center, in this instance, located in a plane which is perpendicular to the axis of the cylindrical portion 32 and symmetrical with respect to the length of the cylindrical portion.

The rollers 30 are received in openings 38 of a roller cage 40 located between the inner and outer members 12 and 20. The openings 38 are generally rectangular in shape with the longitudinal dimension substantially equalling the diameter of the cylindrical portions 32 of the rollers and with the circumferential dimension being larger than the cylindrical portions 32 of the rollers 30. This enables the rollers 30 to rotate about the axis of the cylindrical portions 32 and about other axes, except for the condition where the cylindrical portions 32 contact flat edges of the openings 38, as shown by the upper roller 30 in FIG. 3, for example. The cage 40 can also move circumferentially relative to the rollers 30.

The rollers 30 can be advantageously employed in repair kits for repairing existing constant velocity universal joints. In repairing the joints, some or all of the straight grooves 24 and 28 can be ground to a larger size to smooth the surfaces thereof and in effect, remove worn areas. The rollers 30 can then be provided with the round ends 34 and 36 of corresponding larger size which is larger than the corresponding elements in the original universal joint. However, with the radius of the cylindrical portion 32 of the roller 30 being less than the radius of the rounded ends 34 and 36, the rollers 30 can be received in the same windows 38 of the original cage 40 so that it is not necessary to replace the cage, if in satisfactory condition when the universal joint is repaired. Also, with line contact between the cylindrical portions 32 of the rollers 30 and the circumferentially-extending edges of the cage openings 38, less wear results than with the point contact which exists with conventional balls, and longer life for the universal joint is also achieved. The rollers 30 also appear to provide a smoother operation for the universal joint when installed in a front wheel drive automobile.

Figure 4:
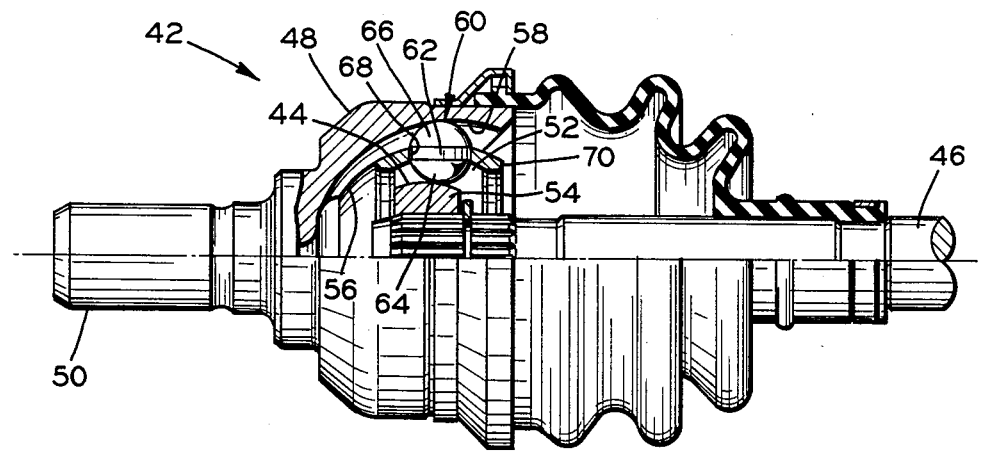
FIG. 4 is a view similar to FIG. 1 of a Rzeppa type universal joint embodying the invention.

Rollers in accordance with the invention can also be employed in Rzeppa constant velocity universal joints as shown in FIG. 4, such joints also being shown in U.S. Pat. No. 2,046,584 issued July 7, 1936, for example. A Rzeppa type universal joint 42 includes an inner member or race 44 affixed to a shaft 46 by suitable means. The universal joint includes an outer member or race 48 integral with a stub shaft 50.

The inner member 44 has a partial spherical surface 52 with curved or arcuate grooves 54 equally spaced therearound circumferentially. The outer member 48 has a partial spherical recess 56 with curved or arcuate grooves 58 therein, being equally spaced circumferentially around the recess.

Each of the rollers 60 has a cylindrical central portion 62 with round ends 64 and 66 received in the grooves 54 and 58, respectively. The round ends have equal radii with a common center located in a plane which is perpendicular to the axis of the cylindrical portion 62 and symmetrical with respect to the length of the cylindrical portion. The rollers 60 are located in openings 68 in a cage 70 and function in the openings similarly to the rollers 30 of FIGS. 1-3, i.e., they can rotate about the axis of the cylindrical portions 62 and about other axes, except for the condition where the cylindrical portions contact the flat edges of the openings 68 which acts as a key, in effect. Advantages are achieved with the rollers 60 similar to those achieved with the rollers 30.

Figure 5:
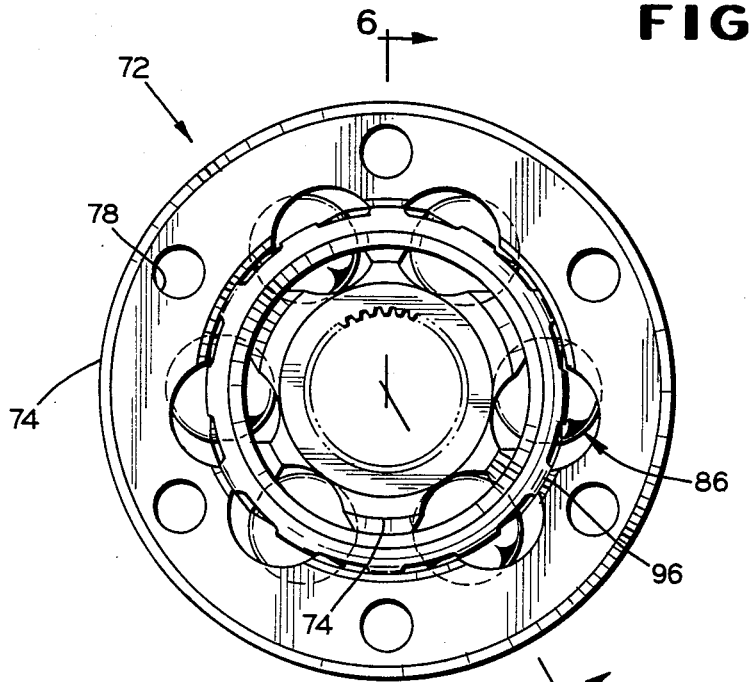
FIG. 5 is a face view of a cross groove type of constant velocity universal joint embodying the invention.
Figure 6:
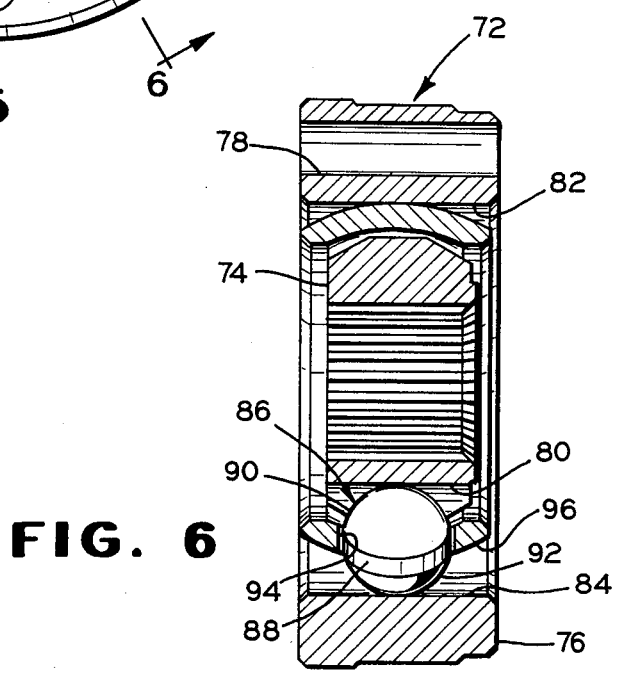
FIG. 6 is a view in cross section taken along the line 6—6 of FIG. 5.

Rollers in accordance with the invention can also be employed in cross groove constant velocity universal joints as shown in FIGS. 5 and 6. A universal joint 72 includes an inner member or race 74 which is designed to be mounted on a shaft similar to the inner races 12 and 54. The joint also includes an outer member or race 76 which is designed to be affixed to another shaft through bolt holes 78. The inner member 74 has straight grooves 80 therein which are angular with respect to the axis of the inner member 74. The outer member 76 has a partially cylindrical cavity 82 around which are spaced grooves 84 which are straight but extend angularly with respect to the axis of the outer member 76. The grooves 80 and 84 are arcuate in transverse cross section with equal radii.

Each of the rollers 86 has a central cylindrical portion 88 with round ends 90 and 92. These are received in the grooves 80 and 84 respectively. The round ends 90 and 92 have equal radii which are also substantially equal to the radii of the grooves 80 and 84. Further, the radii of the round ends have a common center located in a plane which is perpendicular to the axis of the cylindrical portion 88 and symmetrical with respect to the length of the cylindrical portion.

The rollers 86 are received in openings 94 of a roller cage 96. These openings are also of generally rectangular shape with the longitudinal dimension substantially equalling the diameter of the cylindrical portion 88 of the roller and with the circumferential dimension being greater than the diameter of the cylindrical portion. This enables the rollers to rotate similarly to the rollers 30 and 60.

While the grooves of the various universal joints discussed above are all shown as being arcuate in transverse cross section with equal radii, the grooves can also have other shapes in transverse cross section. For example, the grooves can be V-shaped or parabolic shaped in transverse cross section. In the former instance, the ends of the rollers would then be cone shaped. In the latter instance, the ends of the rollers would be partially egg shaped. In addition, the grooves need not necessarily be of equal size in transverse cross section.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A universal joint comprising an inner race having grooves therein facing outwardly, an outer race having grooves therein facing inwardly, a cage between said inner and outer races having spaced openings therein, said openings including opposed linear edge portions having a longitudinal distance therebetween and a one-piece roller in each of said openings having a central cylindrical portion and two round ends, said round ends having equal radii with a common center, with the radius of said cylindrical portion being less than the radii of said round ends said longitudinal distance of said openings substantially equalling the diameter of said cylindrical portions.

2. A universal joint according to claim 1 characterized by said common center of said round end radii lying in a plane which is perpendicular to said central cylindrical portion and which is symmetrical with respect to the length of said cylindrical portion.

3. A universal joint comprising an inner race having central means for providing a nonrotatable attachment to a shaft and having a plurality of uniformly circumferentially spaced grooves having arcuate shapes of a predetermined radius in transverse cross section, an outer race having the same number of uniformly circumferentially spaced grooves as said inner race and having arcuate shapes of the same predetermined radius in transverse cross section, a cage between said inner and outer races and having a plurality of uniformly circumferentially spaced openings therein equal in number to said inner cage grooves and said outer cage grooves, said openings including opposed linear edge portions having a longitudinal distance therebetween, and a roller in each of said openings having a central cylindrical portion and two round ends each having a radius substantially equal to the predetermined radius of said grooves, the radius of said cylindrical portion being less than the radius of the rounded ends, said longitudinal distance of said openings substantially equalling the diameter of said cylindrical portions.

4. A universal joint according to claim 3 characterized by said round end radii having a common center.

5. A universal joint according to claim 4 characterized by said common center being located on a plane through said cylindrical portion with the plane being symmetrical with respect to the length of said cylindrical portion.

6. A universal joint according to claim 3 characterized by said grooves being straight.

7. A universal joint according to claim 6 characterized further by said grooves being parallel to the axes of said inner and outer races, when aligned.

8. A universal joint according to claim 6 characterized by said grooves lying at angles to the axes of said inner and outer races, when aligned.

9. A universal joint according to claim 3 characterized by said grooves being curved in a longitudinal direction.

10. A universal joint according to claim 3 characterized by said cage openings being generally rectangular, with the longitudinal distance between edges of the openings substantially equalling the diameter of said cylindrical portions.

11. A universal joint according to claim 10 characterized by the circumferential distance between edges of the openings exceeding the diameter of the central cylindrical portions.

12. A universal joint comprising an inner race having a plurality of circumferentially spaced grooves therein having generally arcuate shapes in transverse cross section, an outer race having a plurality of circumferentially spaced grooves therearound and having generally arcuate shapes in transverse cross section, a cage between said inner and outer races and having a plurality of circumferentially spaced openings therein, said openings including opposed linear edge portions having a longitudinal distance therebetween, and a one-piece roller in each of said openings having a central cylindrical portion and two round ends, said round ends having equal radii having a common center, the radius of said cylindrical portion being less than the radii of the round ends, one end being of a size and shape substantially equal to the grooves of the inner race and the other end being of a size and shape substantially equal to the grooves of the outer race, said longitudinal distance of said openings substantially equalling the diameter of said cylindrical portions.

13. A universal joint according to claim 12 characterized by said common center being located on a plane through said cylindrical portion with the plane being symmetrical with respect to the length of said cylindrical portion.

14. A universal joint according to claim 12 characterized by said cage openings being generally rectangular, with the longitudinal distance between edges of the openings substantially equalling the diameter of said cylindrical portions.

15. A universal joint according to claim 14 characterized by the circumferential distance between edges of the openings exceeding the diameter of the central cylindrical portions.

* * * * *

Disclaimer 4,541,819.—*Philip J. Mazziotti*, Toledo, Ohio. UNIVERSAL JOINT EMPLOYING BEARING ROLLERS. Patent dated Sept. 17, 1985. Disclaimer filed Oct. 17, 1986, by the assignee, *The Zeller Corp.*

Hereby enters this disclaimer to claims 1 and 2 of said patent.
[*Official Gazette December 9, 1986.*]